(12) United States Patent
Hu et al.

(10) Patent No.: US 10,884,816 B2
(45) Date of Patent: Jan. 5, 2021

(54) MANAGING SYSTEM RESOURCES IN CONTAINERS AND VIRTUAL MACHINES IN A COEXISTING ENVIRONMENT

(71) Applicant: International Business Machines Corporation, Armonk, NY (US)

(72) Inventors: Yanyan Hu, Beijing (CN); Guang Cheng Li, Beijing (CN); Yubo Li, Beijing (CN); Chao Zhu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 429 days.

(21) Appl. No.: 15/471,408

(22) Filed: Mar. 28, 2017

(65) Prior Publication Data

US 2018/0285164 A1 Oct. 4, 2018

(51) Int. Cl.
*G06F 9/50* (2006.01)
*G06F 9/455* (2018.01)

(52) U.S. Cl.
CPC ........ *G06F 9/5077* (2013.01); *G06F 9/45558* (2013.01); *G06F 9/5016* (2013.01); *G06F 2009/45562* (2013.01); *G06F 2009/45579* (2013.01)

(58) Field of Classification Search
CPC .. G06F 9/5077; G06F 9/5016; G06F 9/45558; G06F 2009/45562; G06F 2009/45579
See application file for complete search history.

(56) References Cited

U.S. PATENT DOCUMENTS

| | | | |
|---|---|---|---|
| 9,495,195 B2 | 11/2016 | Terayama et al. | |
| 9,772,792 B1* | 9/2017 | Wallner | G06F 3/0647 |
| 2011/0119423 A1* | 5/2011 | Kishore | G06F 13/102 |
| | | | 710/302 |
| 2015/0058471 A1 | 2/2015 | McPherson et al. | |
| 2015/0074058 A1* | 3/2015 | Zhao | G06F 11/1446 |
| | | | 707/646 |
| 2015/0154057 A1 | 6/2015 | McGrath et al. | |
| 2016/0004551 A1 | 1/2016 | Terayama et al. | |

(Continued)

FOREIGN PATENT DOCUMENTS

JP 5976230 B2 8/2016

OTHER PUBLICATIONS

Mel, et al. "The NIST Definition of Cloud Computing", Recommendations of the National Institute of Standards and Technology. Nov. 16, 2015.

(Continued)

*Primary Examiner* — Shanto Abedin
*Assistant Examiner* — Bruce S Ashley
(74) *Attorney, Agent, or Firm* — Joseph Petrokaitis, Esq.; McGinn IP Law Group, PLLC

(57) ABSTRACT

A resource management method, system, and computer program product for creating a dummy virtual machine (VM) in a Virtual Machine (VM) hypervisor and a dummy container in a container engine for a resource management purpose, adding hooks for each of the VM and the container, and calling the container engine to update a resource allocation in the dummy container when the hook of the VM is started and the VM hypervisor to update a resource allocation in the dummy VM when the hook of the container is started.

19 Claims, 5 Drawing Sheets

(56) References Cited

U.S. PATENT DOCUMENTS

| | | | | |
|---|---|---|---|---|
| 2016/0371127 | A1* | 12/2016 | Antony | G06F 9/5077 |
| 2016/0378563 | A1 | 12/2016 | Gaurav et al. | |
| 2016/0380909 | A1* | 12/2016 | Antony | H04L 47/722 |
| | | | | 370/236 |
| 2017/0060628 | A1* | 3/2017 | Tarasuk-Levin | G06F 9/45558 |
| 2017/0295224 | A1* | 10/2017 | Tino | G06F 9/5077 |
| 2018/0032362 | A1* | 2/2018 | Buil | G06F 9/4856 |

OTHER PUBLICATIONS

Li Li, et al. "Resource Management in the VM Container", IEEE; DOI: 10.1109/CLOUD.2015.91, Jun. 27-Jul. 2, 2015, Cloud Computing (CLOUD), 2015 IEEE $8^{th}$ International Conference on.

Arnaud Gaboury "Control Groups Resource Management" Libvirt: Download Contribute Learn, Feb. 10, 2014.

Li Li, et al. "A REST Service Framework for Fine-Grained Resource Management in Container-Based Cloud", 2015 IEEE $8^{th}$ International Conference on Cloud Computing, Bridge Water, New Jersey, USA.

* cited by examiner

//MANAGING SYSTEM RESOURCES IN CONTAINERS AND VIRTUAL MACHINES IN A COEXISTING ENVIRONMENT

BACKGROUND

The present invention relates generally to a resource management method, and more particularly, but not by way of limitation, to a system, method, and computer program product for dummy containers to track resource consumption by Virtual Machines (VMs) and for dummy VMs to track the resource consumption by containers.

Containers co-existing in the same environment as Virtual Machines (VMs) is an emerging technology. Because of different use cases with virtual machines, there will be a long term coexistence with containers and VMs.

However, the coexistence of VMs and containers creates a problem that containers run directly on the host and resource management is through a cgroup of the host kernel. Also, VMs are run through a hypervisor and resource management is done by the hypervisor. In other words, the containers and VMs cannot see each other from a resource management perspective because the hypervisor (e.g., VM resource manager), cloud software (e.g., hypervisor resource manager at a distributed system level), container engine (e.g., container resource manager), and container orchestration engine (e.g., container engine manager at a distributed system level) confuse the resources because there is no communication therebetween when the VMs and containers compete for resources. This results in system resource overcommitment and exhaustion.

Thus, there is a need in the art for a resource management technique that allows communication between the containers and VMs.

SUMMARY

In an exemplary embodiment, the present invention can provide a computer-implemented resource management method, the method including creating a dummy virtual machine (VM) in a Virtual Machine (VM) hypervisor and a dummy container in a container engine for a resource management purpose, adding hooks for VMs and the containers, and calling the container engine to update a resource allocation in the dummy container when the hook of the VM is started and the VM hypervisor to update a resource allocation in the dummy VM when the hook of the container is started. One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
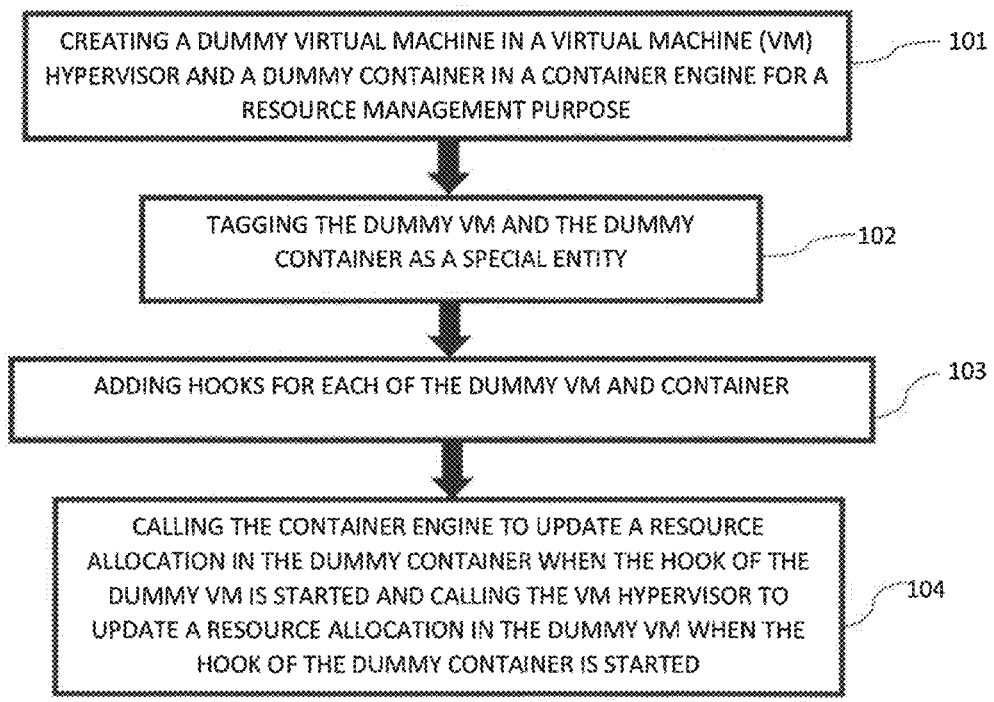
FIG. 1 exemplarily shows a high-level flow chart for a resource management method 100 according to an embodiment of the present invention.

The invention will now be described with reference to FIGS. 1-5, in which like reference numerals refer to like parts throughout. It is emphasized that, according to common practice, the various features of the drawings are not necessarily to scale. On the contrary, the dimensions of the various features can be arbitrarily expanded or reduced for clarity.

By way of introduction of the example depicted in FIG. 1, an embodiment of a resource management method 100 according to the present invention can include various steps for communicating resource usage between a VM and container.

Figure 3:
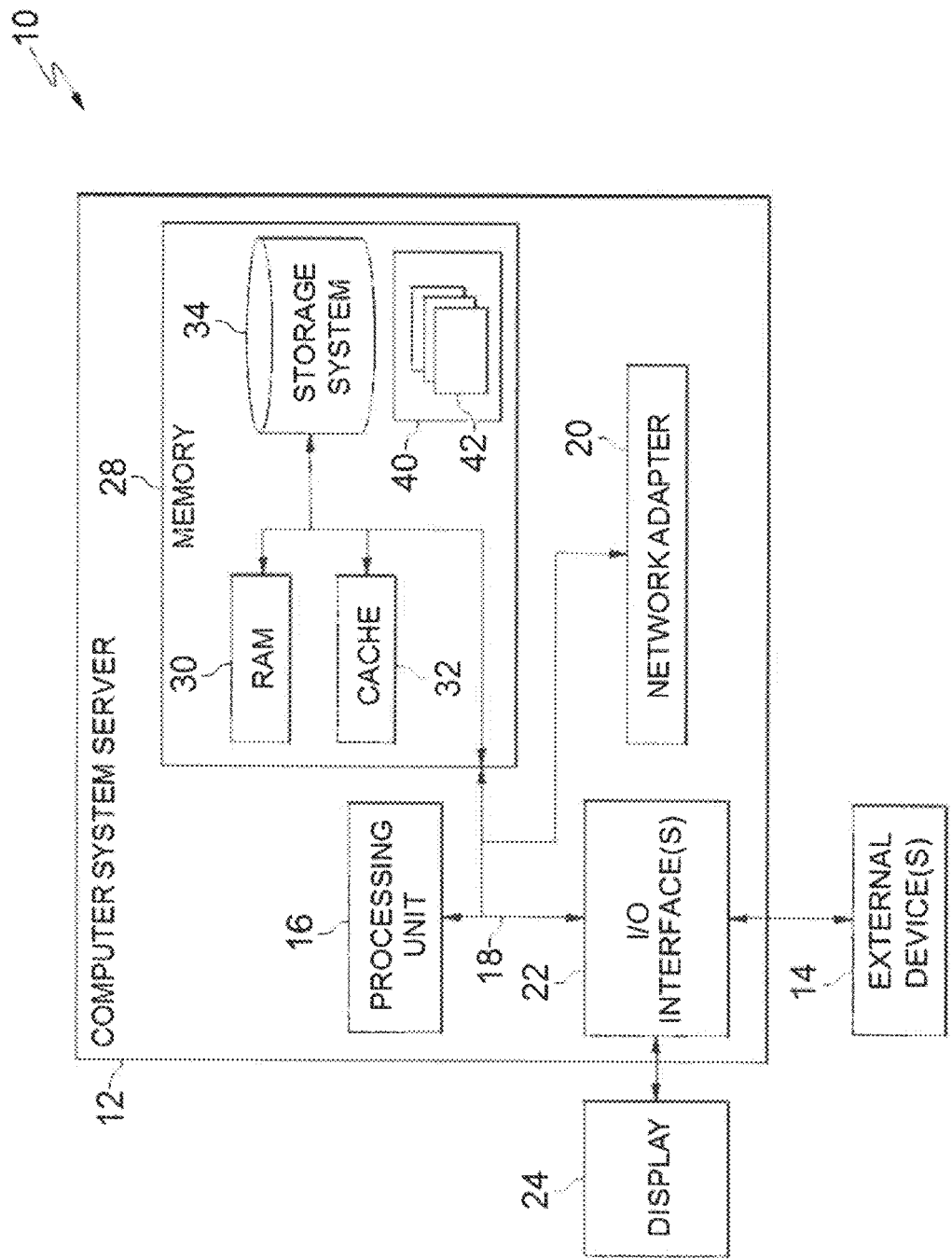
FIG. 3 depicts a cloud-computing node 10 according to an embodiment of the present invention.

By way of introduction of the example depicted in FIG. 3, one or more computers of a computer system 12 according to an embodiment of the present invention can include a memory 28 having instructions stored in a storage system to perform the steps of FIG. 1.

Although one or more embodiments may be implemented in a cloud environment 50 (see e.g., FIG. 4), it is nonetheless understood that the present invention can be implemented outside of the cloud environment.

Figure 2:
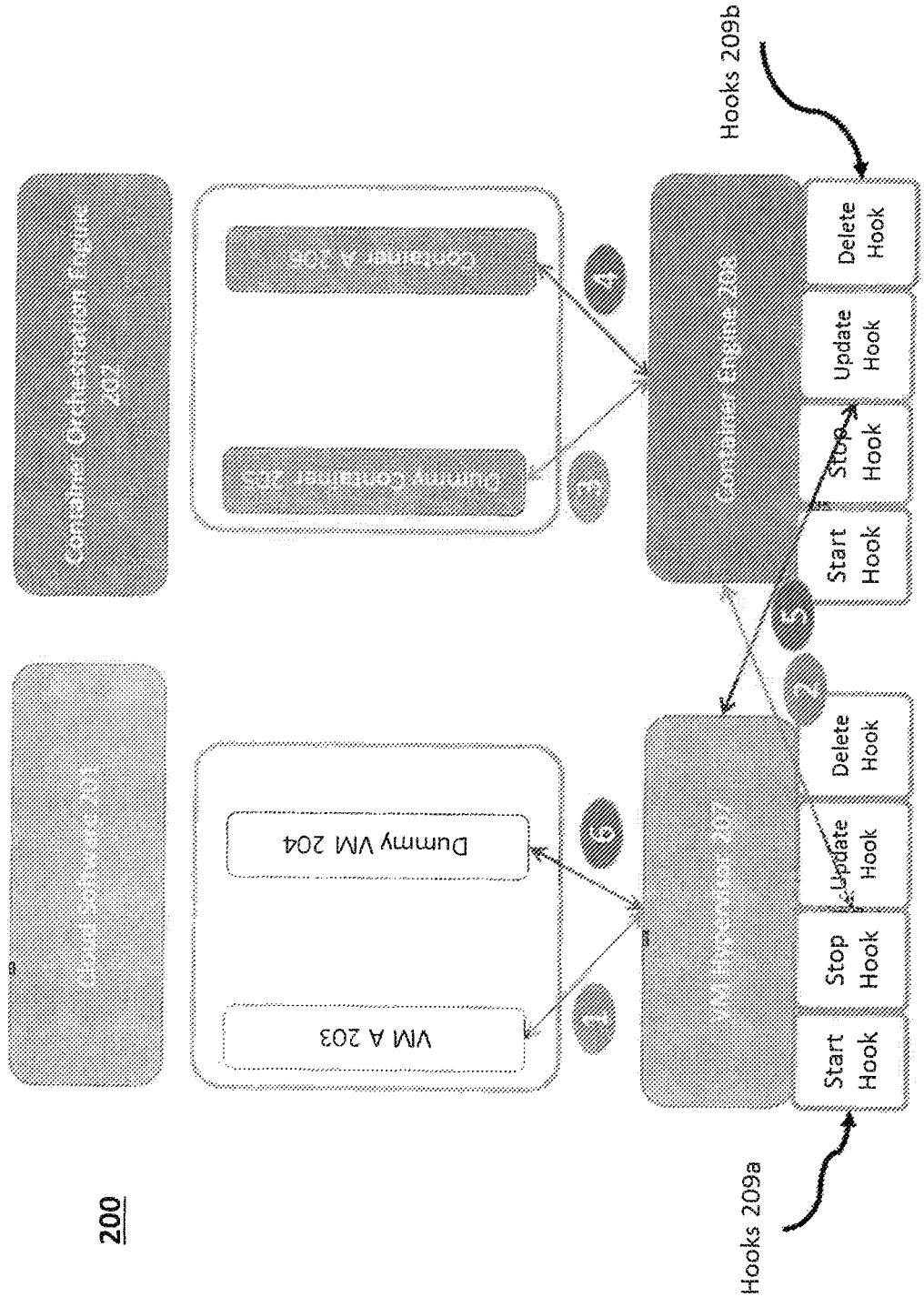
FIG. 2 exemplarily depicts an exemplary system 200 diagram according to an embodiment of the present invention.

With reference generally to FIG. 1 and FIG. 2, a Virtual Machine (VM) hypervisor 207 manages the VM A 203 and Dummy VM 204 at a system level. Each VM hypervisor has hooks 209a as a start hook, stop hook, update hook, and delete hook. The cloud software 201 manages the VM hypervisors 207 at a distributed system level (e.g., manages a plurality of VM hypervisors 207). Similarly, the container engine 208 manages the dummy container 205 and the container A 206 at a system level. The container engine 208 has hooks 209b as a start hook, stop hook, update hook, and delete hook. The container orchestration engine 202 manages the container engine 208 at a distributed system level (i.e., manages a plurality of container engines 208).

Referring now to FIG. 1, in step 101, a dummy virtual machine in a Virtual Machine (VM) hypervisor and a dummy container in a container engine for a resource management purpose are created. The dummy VM and the dummy container will not be started. In some embodiments, one dummy VM for each container, and one dummy container for each VM, with the same resource configuration can be created.

In step 102, the dummy VM and the dummy container are tagged as a special entity.

In step 103, hooks are added for each of the dummy VM and the dummy container. That is, start/stop/update/delete hooks are added for VMs and containers.

In step 104, the container engine is called to update a resource allocation in the dummy container when the hook of the VM is started (activated) and the VM hypervisor is called to update a resource allocation in the dummy VM when the hook of the container is started. In other words, when any VM is started/stopped/updated/deleted, the VM hooks will call the container engine to update the resource of the dummy container, so the container engine "knows" that the resources are reserved for the VM and when any container is started/stopped/updated/deleted, the container hooks will call the VM hypervisor to update the resource of dummy VM, so the VM hypervisor "knows" that the resources are reserved for the containers.

When updating the resources, for the CPU and memory capping settings for the containers, the CPU and memory settings of the dummy VM are updated. Also, for the disk space capping settings for the containers, a virtual disk with proper disk space to the VM is assigned. For the disk I/O bandwidth and frequency of read/write settings for the containers, the I/O throttle for the dummy VM is set. For the network bandwidth capping for the containers, set the network bandwidth upper bound for the dummy VM is set. And, for the devices pass-through to the containers, pass-through the device to the dummy VM is set.

When updating the resource of the dummy container, for the CPU and memory configured for the VMs, crgroup resource capping settings of the dummy container are updated. For the disk space assigned to the VMs, the storage capping value for the dummy container is set. The dummy container could use the storage backends that supports file system quota like device mapper, btrfs, zfs, etc. For the disk I/O bandwidth and frequency of read/write, the cgroup blkio.throttle for the dummy container is set. For the network bandwidth and virtual interfaces allocated for the VMs, the Linux tc (traffic control) to set the network bandwidth capping for the containers is called. For the devices pass-through to the VMs, the cgroup devices.allow to pass-through the device to the dummy container is updated.

Further, resource labels with the dummy VM or dummy container are set, the VM hypervisor or container engine will parse the resource labels and get the resources information, the VM hypervisor or container engine will provide the resources information to the upper layer cloud software or container orchestration engine, and the cloud software or container orchestration engine will make scheduling decision based on the resources information.

Thereby, the invention as depicted in FIGS. 1-2 is implemented by adding hooks for VMs' and containers' start/stop/update/delete. When the VM is started/stopped/updated/deleted, the hook will call the container engine to update the resource of the dummy container. When the container is started/stopped/updated/deleted, the hook will call the VM hypervisor to update the resource of dummy VM. This is transparent for the upper layer cloud software and container orchestration engine. Therefore, as depicted in FIG. 2, the call flow is implemented by (1) the VM hypervisor 207 manipulates the VM A 203 (e.g., an actual VM on one system), (2) the VM hypervisor hook 209a sends the request to the container engine 208, (3) the container engine 208 manipulates the dummy container 205, (4) the container engine 208 manipulates the container A (e.g., one container on a system managed by the container engine 208), (5) the container engine 208 hook 209b sends the request to the VM hypervisor 207, and (6) the VM hypervisor 207 manipulates the dummy VM 204.

By the embodiments described above, the system resources on a host with both VMs and containers can be managed, the VMs and containers start/stop/update/delete hooks can be added, and dummy container that claim but not use the system resource and dummy VMs that claim but not use the system resource can be managed. Also, mapping the resource consumption from the VMs to the dummy container and mapping the resource consumption from the containers to the dummy VMs can allow for transparency to the cloud software and transparency to the container orchestration engine.

In some embodiments, the dummy container or dummy VM will have the same lifecycle with the corresponding container or VM.

Thus, the method 100 can provide steps to manage the system resources on a host that has both VMs and containers, map a container resource consumption to a dummy VM, map a VM resource consumption to a dummy container, manipulate the resource of the corresponding dummy container when manipulating a VM, and manipulate the resource of the corresponding dummy VM when manipulating a container Exemplary Aspects, Using a Cloud Computing Environment Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system server 12, it is understood to be operational with numerous other general purpose or special purpose computing system environments or configurations. Examples of well-known computing systems, environments, and/or configurations that may be suitable for use with computer system server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 3, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 4:
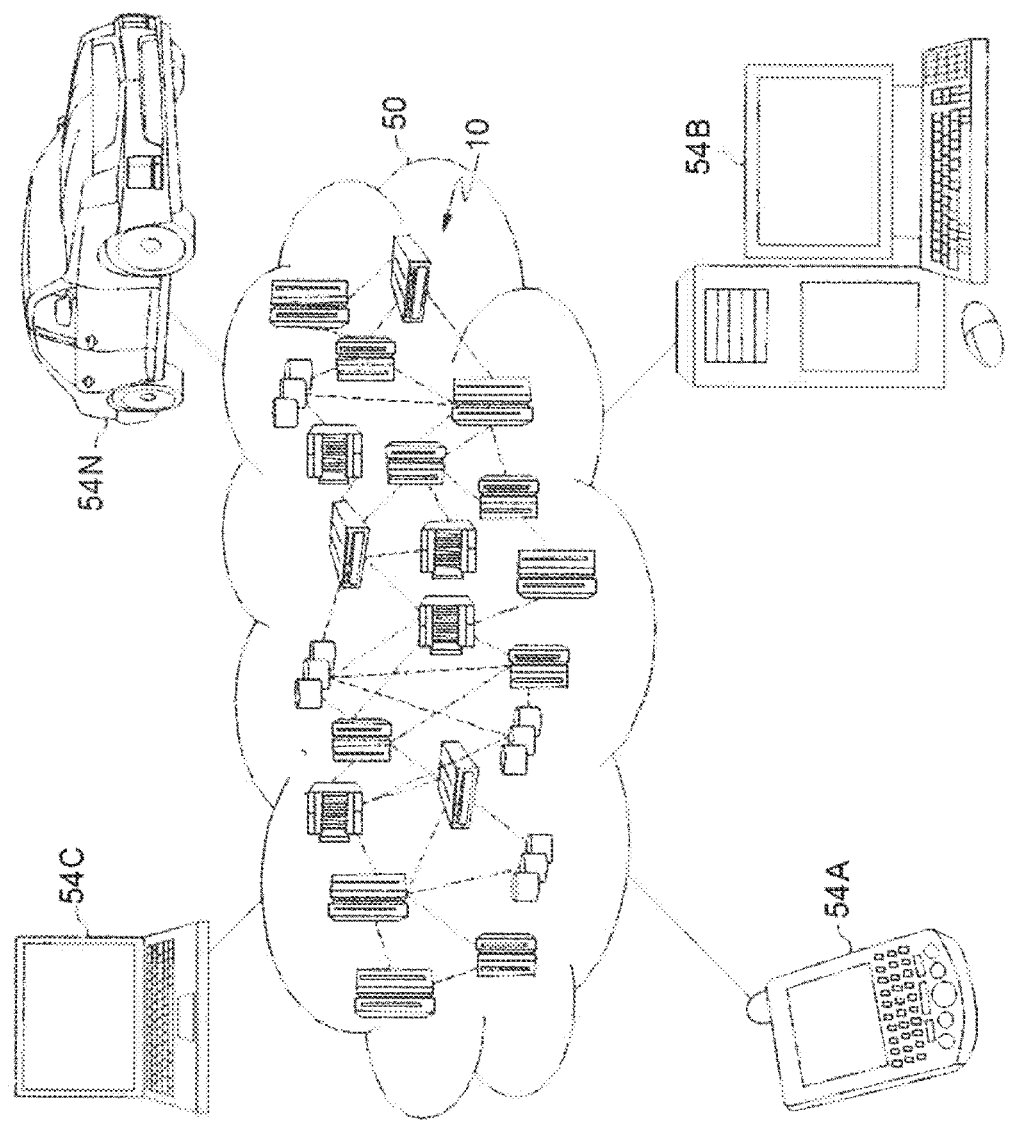
FIG. 4 depicts a cloud-computing environment 50 according to an embodiment of the present invention.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud computing environment 50 can communicate with any type of computerized circuit over any type of network and/or network addressable connection (e.g., using a web browser).

Figure 5:
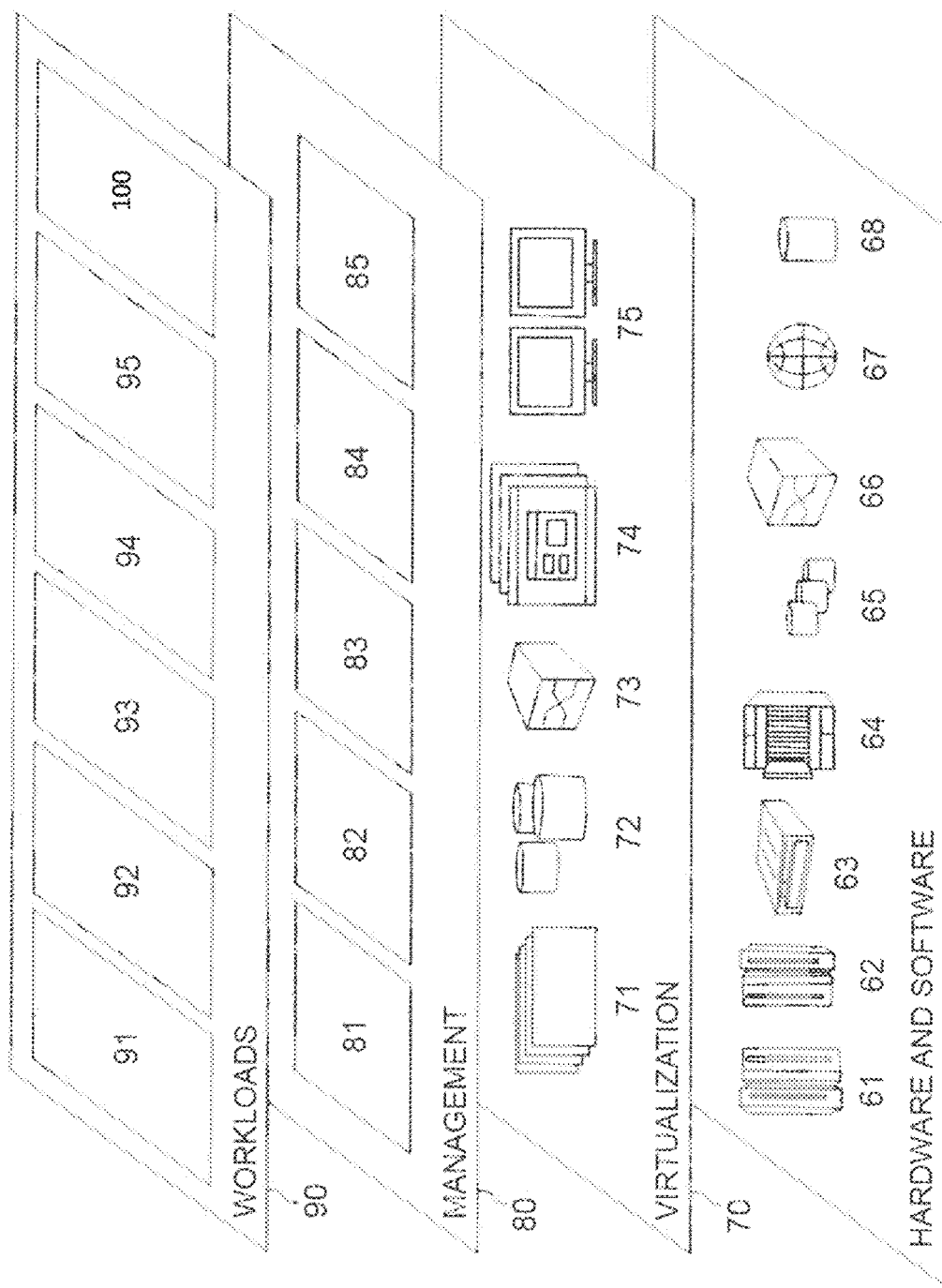
FIG. 5 depicts abstraction model layers according to an embodiment of the present invention.

Referring now to FIG. 5, an exemplary set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and resource management method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented resource management method, the method comprising:
    creating a dummy virtual machine (VM) in a Virtual Machine (VM) hypervisor and a dummy container in a container engine for a resource management purpose;
    tagging the dummy virtual machine and the dummy container as a special entity;
    adding hooks for each of the dummy VM and the dummy container that are tagged as the special entity; and
    calling the container engine to update a resource allocation in the dummy container when the hook of the dummy VM is started and the VM hypervisor to update a resource allocation in the dummy VM when the hook of the container is started,
    wherein the dummy container and the dummy VM are running in coexistence as peers, and wherein the dummy VM and the dummy container claim the resource consumption without actually consuming the resource, then further comprising:
managing the resource consumption correctly when the dummy VM and the dummy container are in coexistence on a same node with all changes being transparent to the VM hypervisor, container engine, cloud software, and the container orchestration engine.

2. The computer-implemented method of claim 1, wherein one dummy VM for each container, and one dummy container for each Virtual Machine (VM), with a same resource configuration is created.

3. The computer-implemented method of claim 1, wherein for a Central Processing Unit (CPU) and memory capping settings for a container, updating CPU and memory settings of the dummy VM.

4. The computer-implemented method of claim 1, wherein for disk space capping settings for the dummy container, assigning a virtual disk with disk space to the Virtual Machine (VM) hypervisor.

5. The computer-implemented method of claim 1, wherein for disk Input/Output (I/O) bandwidth and frequency of read/write settings for a container, setting I/O throttle for the dummy VM.

6. The computer-implemented method of claim 1, wherein for network bandwidth capping for a container, setting a network bandwidth upper bound for the dummy VM.

7. The computer-implemented method of claim 1, wherein for a devices pass-through to the dummy container, pass-through the device to the dummy VM.

8. The computer-implemented method of claim 1, wherein for a Central Processing Unit (CPU) and memory configured for a Virtual Machine, updating cgroup resource capping settings of the dummy container.

9. The computer-implemented method of claim 1, wherein for disk space assigned to a Virtual Machine (VM), setting the storage capping value for the dummy container, and
wherein the dummy container utilizes storage backends that supports a file system quota.

10. The computer-implemented method of claim 1, wherein for disk I/O bandwidth and frequency of read/write, setting a cgroup blkio.throttle for the dummy container.

11. The computer-implemented method of claim 1, wherein for a network bandwidth and virtual interfaces allocated for the Virtual Machine (VM), calling Linux traffic control to set the network bandwidth capping for the container.

12. The computer-implemented method of claim 1, wherein for a devices pass-through to the Virtual Machine (VM) hypervisor, updating cgroup devices to allow to pass-through the device to the dummy container.

13. The computer-implemented method of claim 1, wherein the dummy container or dummy VM has a same lifecycle with a corresponding container or Virtual Machine (VM).

14. The computer-implemented method of claim 1, wherein a cloud software or the container orchestration engine make scheduling decisions based on the resources allocation information.

15. The computer-implemented method of claim 1, embodied in a cloud-computing environment.

16. A computer program product for resource management, the computer program product comprising a computer readable storage medium having program instructions embodied therewith, the program instructions executable by a computer to cause the computer to perform:
creating a dummy virtual machine (VM) in a Virtual Machine (VM) hypervisor and a dummy container in a container engine for a resource management purpose;
tagging the dummy virtual machine and the dummy container as a special entity;
adding hooks for each of the dummy VM and the dummy container that are tagged as the special entity; and
calling the container engine to update a resource allocation in the dummy container when the hook of the dummy VM is started and the VM hypervisor to update a resource allocation in the dummy VM when the hook of the container is started,
wherein the dummy container and the dummy VM are running in coexistence as peers, and
wherein the dummy VM and the dummy container claim the resource consumption without actually consuming the resource, then further comprising:
managing the resource consumption correctly when the dummy VM and the dummy container are in coexistence on a same node with all changes being transparent to the VM hypervisor container engine, cloud software, and the container orchestration engine.

17. A resource management system, said system comprising:
a processor; and
a memory, the memory storing instructions to cause the processor to perform:
creating a dummy virtual machine (VM) in a Virtual Machine (VM) hypervisor and a dummy container in a container engine for a resource management purpose;
tagging the dummy virtual machine and the dummy container as a special entity;
adding hooks for each of the dummy VM and the dummy container that are tagged as the special entity; and
calling the container engine to update a resource allocation in the dummy container when the hook of the dummy VM is started and the VM hypervisor to update a resource allocation in the dummy VM when the hook of the container is started,
wherein the dummy container and the dummy VM are running in coexistence as peers, and
wherein the dummy VM and the dummy container claim the resource consumption without actually consuming the resource, then further comprising:
managing the resource consumption correctly when the dummy VM and the dummy container are in coexistence on a same node with all changes being transparent to the VM hypervisor, container engine, cloud, software, and the container orchestration engine.

18. The system of claim 17, embodied in a cloud-computing environment.

19. The system of claim 17, wherein, when any container is started/stopped/updated/deleted, the container hooks calls the VM hypervisor to update the resource of dummy VM such that the VM hypervisor saves that the resources are reserved for the containers.

* * * * *